(12) United States Patent
Higurashi

(10) Patent No.: US 6,525,776 B1
(45) Date of Patent: Feb. 25, 2003

(54) INFORMATION COMPRESSING APPARATUS AND METHOD

(75) Inventor: Seiji Higurashi, Fuchu (JP)

(73) Assignee: Victor Company of Japan, Ltd., Yokohama (JP)

( * ) Notice: Subject to any disclaimer, the term of this patent is extended or adjusted under 35 U.S.C. 154(b) by 0 days.

(21) Appl. No.: 09/363,093

(22) Filed: Jul. 30, 1999

(30) Foreign Application Priority Data

Aug. 20, 1998 (JP) .......................................... 10-234636
Aug. 20, 1998 (JP) .......................................... 10-234638

(51) Int. Cl.[7] .............................. H04N 5/04; H04N 9/44
(52) U.S. Cl. ........................ 348/500; 348/616; 348/617; 348/512; 348/523; 348/714; 348/716; 348/718; 386/2; 386/51
(58) Field of Search ................................ 348/500, 512, 348/526, 521, 522, 523, 524, 714, 715, 716, 718, 616, 615, 553; 386/2, 47, 51, 113

(56) References Cited

U.S. PATENT DOCUMENTS

| | | | | |
|---|---|---|---|---|
| 4,199,780 A | * | 4/1980 | Taylor | 348/617 |
| 4,943,858 A | * | 7/1990 | Kitaura et al. | 348/616 |
| 5,166,794 A | * | 11/1992 | Tanaka | 348/607 |
| 5,280,396 A | * | 1/1994 | Hamaguchi et al. | 348/525 |
| 5,359,366 A | * | 10/1994 | Ubukata et al. | 348/497 |
| 5,363,200 A | * | 11/1994 | Frohbach et al. | 369/97 |
| 5,899,578 A | * | 5/1999 | Yanagihara et al. | 386/47 |
| 6,040,867 A | * | 3/2000 | Bando et al. | 348/461 |
| 6,078,594 A | * | 6/2000 | Anderson et al. | 348/462 |
| 6,148,031 A | * | 11/2000 | Kato | 348/220.1 |
| 6,301,299 B1 | * | 10/2001 | Sita et al. | 348/714 |
| 6,363,118 B1 | * | 3/2002 | Kondo et al. | 348/603 |

* cited by examiner

Primary Examiner—John Miller
Assistant Examiner—Linus H. Lo
(74) Attorney, Agent, or Firm—Louis Woo

(57) ABSTRACT

An information processing apparatus includes an address generation circuit for generating an address signal. A memory operates for storing an information signal containing a video signal in response to the address signal. The address signal is periodically updated. A compression processing circuit operates for reading out the information signal from the memory, and subjecting the readout information signal to a compressively encoding process. A head of every frame represented by the information signal is detected. A state of the address signal is stored which corresponds to the detected frame head. Detection is made as to whether or not the information signal becomes discontinuous. The updating of the address signal and also the operation of the compression processing circuit are suspended when it is detected that the information signal becomes discontinuous. Detection is made as to whether or not the information signal returns to a normally continuous state after the information signal becomes discontinuous. The updating of the address is started from the stored state when it is detected that the information signal returns to its normally continuous state after the information signal becomes discontinuous.

10 Claims, 4 Drawing Sheets

INFORMATION COMPRESSING APPARATUS AND METHOD

BACKGROUND OF THE INVENTION

1. Field of the Invention

This invention generally relates to information compressing apparatus and method. This invention particularly relates to a method and an apparatus for compressively encoding an information signal including at least a video signal. Also, this invention relates to a method and an apparatus for processing a video signal.

2. Description of the Related Art

A prior-art information compressing apparatus in an MPEG (Moving Picture Experts Group) system compressively encodes a stream of original pictures each assigned to one of first, second, and third types. The first type corresponds to I-pictures (intra-coded pictures). The second type corresponds to P-pictures (predictive-coded pictures). The third type corresponds to B-pictures (bidirectionally predictive-coded pictures). The prior-art information compressing apparatus implements a compressing process GOP by GOP, where GOP means a group of pictures. Every GOP is composed of one I-picture and at least one P-picture or one B-picture. For every GOP, an I-picture is encoded first even in the case where the I-picture occupies a second or later picture place within the GOP.

As the numbers of original pictures in GOP's increase, the qualities of encoding-resultant pictures rise. As the numbers of original pictures in GOP's increase, units of the compressing process increase so that units of editing picture information also increase. The increased units make fine editing difficult. On the other hand, as the numbers of original pictures in GOP's decrease, the qualities of encoding-resultant pictures drop.

It is assumed that editing causes encoding to pause at a P-picture in a GOP which follows an I-picture therein in the order of encoding. When encoding is restarted, it is necessary to commence encoding from the I-picture in that GOP again. Accordingly, in this case, the encoding of the I-picture is executed twice, and hence the efficiency of editing-related encoding work tends to be low.

SUMMARY OF THE INVENTION

It is an object of this invention to provide an improved information compressing apparatus.

It is another object of this invention to provide an improved method of compressing information.

A first aspect of this invention provides an information processing apparatus comprising an address generation circuit for generating an address signal; a memory for storing an information signal containing a video signal in response to the address signal generated by the address generation circuit; first means for periodically updating the address signal generated by the address generation circuit; a compression processing circuit for reading out the information signal from the memory, and subjecting the read-out information signal to a compressively encoding process; second means for detecting a head of every frame represented by the information signal; third means for storing a state of the address signal generated by the address generation circuit which corresponds to the frame head detected by the second means; fourth means for detecting whether or not the information signal becomes discontinuous; fifth means for suspending operation of the first means and also operation of the compression processing circuit when the fourth means detects that the information signal becomes discontinuous; sixth means for detecting whether or not the information signal returns to a normally continuous state after the information signal becomes discontinuous; and seventh means for starting the updating of the address signal by the first means from the state stored by the third means when the sixth means detects that the information signal returns to its normally continuous state after the information signal becomes discontinuous.

A second aspect of this invention is based on the first aspect thereof, and provides an information processing apparatus wherein the fourth means comprises a sync separator for separating a first sync signal from the information signal; a PLL circuit for generating a second sync signal in response to the first sync signal; and a comparator for comparing the first sync signal and the second sync signal to detect whether or not the information signal becomes discontinuous.

A third aspect of this invention is based on the first aspect thereof, and provides an information processing apparatus wherein the fourth means comprises an encoding pause button; and means for detecting whether or not the information signal becomes discontinuous in response to a position of the encoding pause button.

A fourth aspect of this invention is based on the first aspect thereof, and provides an information processing apparatus wherein the sixth means comprises an encoding pause button; and means for detecting whether or not the information signal returns to a normally continuous state after the information signal becomes discontinuous in response to a position of the encoding pause button.

A fifth aspect of this invention provides an information processing apparatus comprising a first address generation circuit for generating a first address signal corresponding to a pixel; a second address generation circuit for generating a second address signal corresponding to a frame; a memory for storing an information signal containing a video signal in response to the first address signal and the second address signal generated by the first address generation circuit and the second address generation circuit; first means for periodically updating the first address signal generated by the first address generation circuit; second means for updating the second address signal generated by the second address generation circuit in response to the first address signal generated by the first address generation circuit; a compression processing circuit for reading out the information signal from the memory, and subjecting the read-out information signal to a compressively encoding process; third means for detecting a head of every frame represented by the information signal; fourth means for detecting whether or not the information signal becomes discontinuous; fifth means for suspending operation of the first means and also operation of the compression processing circuit when the fourth means detects that the information signal becomes discontinuous; sixth means for returning the first address signal to a predetermined initial state when the fourth means detects that the information signal becomes discontinuous; seventh means for detecting whether or not the information signal returns to a normally continuous state after the information signal becomes discontinuous; and eighth means for, in cases where the seventh means detects that the information signal returns to its normally continuous state after the information signal becomes discontinuous, starting the updating of the first address signal by the first means from the predetermined initial state when the third means detects a frame head.

A sixth aspect of this invention is based on the fifth aspect thereof, and provides an information processing apparatus wherein the fourth means comprises a sync separator for separating a first sync signal from the information signal; a PLL circuit for generating a second sync signal in response to the first sync signal; and a comparator for comparing the first sync signal and the second sync signal to detect whether or not the information signal becomes discontinuous.

A seventh aspect of this invention is based on the fifth aspect thereof, and provides an information processing apparatus wherein the fourth means comprises an encoding pause button; and means for detecting whether or not the information signal becomes discontinuous in response to a position of the encoding pause button.

An eighth aspect of this invention is based on the fifth aspect thereof, and provides an information processing apparatus wherein the seventh means comprises an encoding pause button; and means for detecting whether or not the information signal returns to a normally continuous state after the information signal becomes discontinuous in response to a position of the encoding pause button.

A ninth aspect of this invention provides an apparatus comprising first means for detecting whether or not a first video signal becomes discontinuous and hence a defective frame picture occurs in a stream of frame pictures represented by the first video signal; and second means for removing the defective frame picture from the stream of frame pictures to change the first video signal into a second video signal representing the stream of frame pictures except the defective frame picture.

A tenth aspect of this invention provides a method comprising the steps of generating an address signal; storing an information signal into a memory in response to the address signal, the information signal containing a video signal; periodically updating the address signal; reading out the information signal from the memory, and subjecting the read-out information signal to a compressively encoding process; detecting a head of every frame represented by the information signal; storing a state of the address signal which corresponds to the detected frame head; detecting whether or not the information signal becomes discontinuous; suspending the updating of the address signal, and also the reading-out of the information signal from the memory and the subjecting of the read-out information signal to the compressively encoding process when it is detected that the information signal becomes discontinuous; detecting whether or not the information signal returns to a normally continuous state after the information signal becomes discontinuous; and starting the updating of the address signal when it is detected that the information signal returns to its normally continuous state after the information signal becomes discontinuous.

An eleventh aspect of this invention provides a method comprising the steps of generating a first address signal corresponding to a pixel; generating a second address signal corresponding to a frame; storing an information signal into a memory in response to the first address signal and the second address signal, the information signal containing a video signal; periodically updating the first address signal; updating the second address signal in response to the first address signal; reading out the information signal from the memory, and subjecting the readout information signal to a compressively encoding process; detecting a head of every frame represented by the information signal; detecting whether or not the information signal becomes discontinuous; suspending the updating of the first address signal, and also the reading-out of the information signal from the memory and the subjecting of the read-out information signal to the compressively encoding process when it is detected that the information signal becomes discontinuous; returning the first address signal to a predetermined initial state when it is detected that the information signal becomes discontinuous; detecting whether or not the information signal returns to a normally continuous state after the information signal becomes discontinuous; and in cases where it is detected that the information signal returns to its normally continuous state after the information signal becomes discontinuous, starting the updating of the first address signal from the predetermined initial state when a frame head is detected.

A twelfth aspect of this invention provides a method comprising the steps of detecting whether or not a first video signal becomes discontinuous and hence a defective frame picture occurs in a stream of frame pictures represented by the first video signal; and removing the defective frame picture from the stream of frame pictures to change the first video signal into a second video signal representing the stream of frame pictures except the defective frame picture.

DESCRIPTION OF THE PREFERRED EMBODIMENTS

First Embodiment

Figure 1:
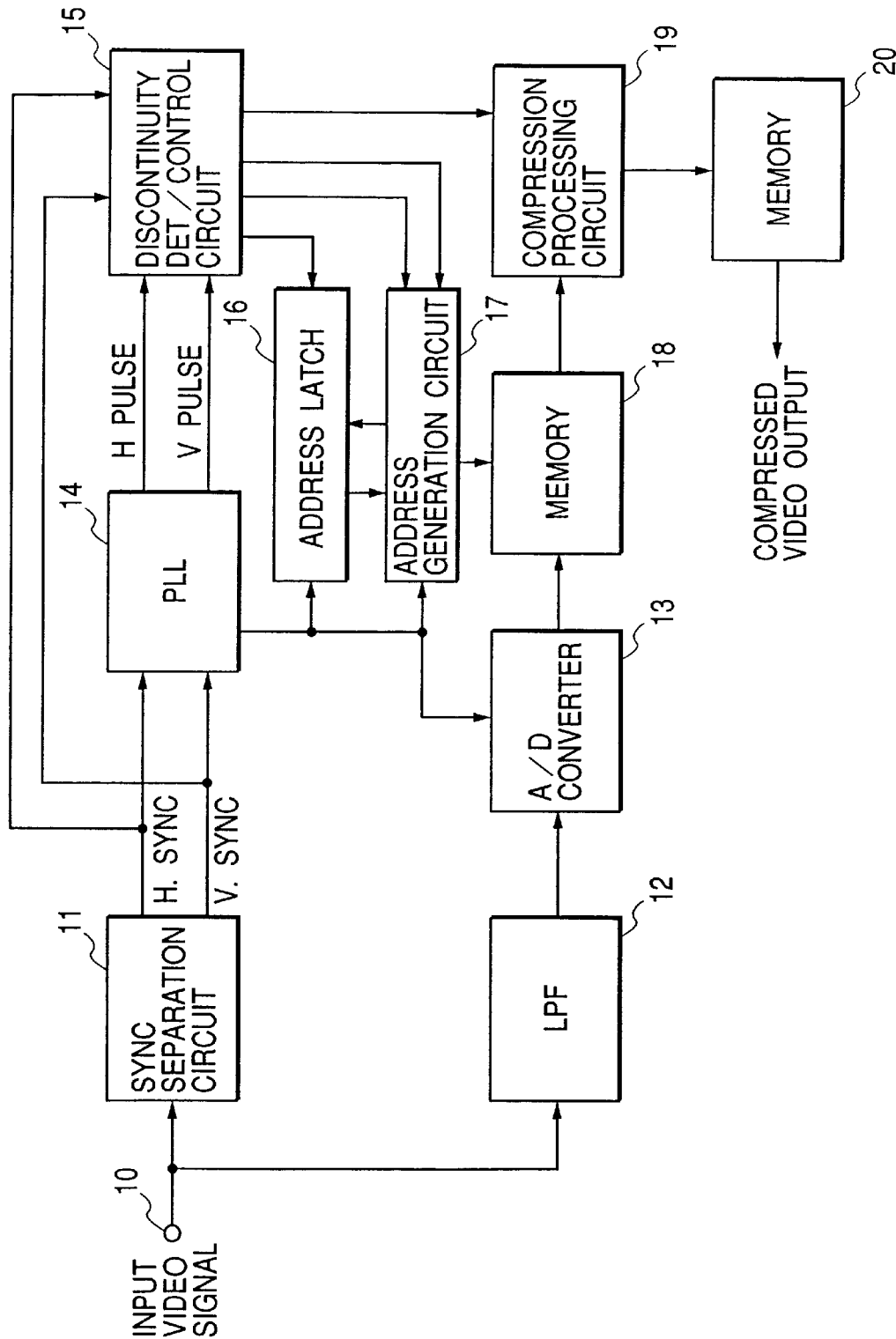
FIG. 1 is a block diagram of an information compression apparatus according to a first embodiment of this invention.

FIG. 1 shows an information compressing apparatus according to a first embodiment of this invention. With reference to FIG. 1, an analog input video signal is fed via an input terminal 10 to a sync separation circuit 11 and a low pass filter (LPF) 12.

The sync separation circuit 11 separates a horizontal sync signal (H. SYNC) from the input video signal. In addition, the sync separation circuit 11 separates a vertical sync signal (V. SYNC) from the input video signal.

The low pass filter 12 removes high-frequency components from the input video signal. The low pass filter 12 outputs a resultant signal to an analog-to-digital (A/D) converter 13. The A/D converter 13 changes the output signal of the low pass filter 12 into a corresponding digital video signal in response to a clock signal (a sampling clock signal) "fs".

The sync separation circuit 11 outputs the horizontal sync signal and the vertical sync signal to a PLL (phase locked loop) circuit 14. A first section of the PLL circuit 14 generates a sampling clock signal "fs" in response to the horizontal sync signal and the vertical sync signal. The sampling clock signal "fs" has a given frequency equal to or higher than twice the maximum frequency of the input video signal. The sampling clock signal "fs" is phase-locked with respect to the horizontal sync signal and the vertical sync signal. A second section of the PLL circuit 14 generates an H pulse signal in response to the horizontal sync signal. The H pulse signal is phase-locked with respect to the horizontal sync signal. The H pulse signal has a given frequency equal to a horizontal scanning frequency related to the input video signal. A third section of the PLL circuit 14 generates a V pulse signal in response to the vertical sync signal. The V pulse signal is phase-locked with respect to the vertical sync signal. The V pulse signal has a given frequency equal to a vertical scanning frequency related to the input video signal.

When a discontinuity occurs in the input video signal, at least one of the horizontal sync signal and the vertical sync signal outputted from the sync separation circuit 11 becomes also discontinuous. On the other hand, during a short time interval following the moment of the occurrence of the discontinuity, the H pulse signal and the V pulse signal generated by the PLL circuit 14 continue to be in conditions phase-locked with respect to the horizontal sync signal and the vertical sync signal which are present before the occurrence of the discontinuity.

The sync separation circuit 11 outputs the horizontal sync signal and the vertical sync signal to a discontinuity detection/control circuit 15. The PLL circuit 14 outputs the H pulse signal and the V pulse signal to the discontinuity detection/control circuit 15.

The discontinuity detection/control circuit 15 compares the phases of the horizontal sync signal and the H pulse signal with each other. Also, the discontinuity detection/control circuit 15 compares the phases of the vertical sync signal and the V pulse signal with each other. These phase comparisons are to determine whether or not the input video signal becomes discontinuous (determine whether or not at least one of the phase lock between the horizontal sync signal and the H pulse signal and the phase lock between the vertical sync signal and the V pulse signal is lost). When it is determined that the input video signal becomes discontinuous, the discontinuity detection/control circuit 15 generates a disabling signal and a halt signal. The discontinuity detection/control circuit 15 outputs the disabling signal to an address generation circuit 17. The discontinuity detection/control circuit 15 outputs the halt signal to a compression processing circuit 19.

The discontinuity detection/control circuit 15 generates a signal of an effective area of pictures (frames or fields) represented by the input video signal in response to the H pulse signal and the V pulse signal. As long as it is determined that the input video signal does not become discontinuous, the discontinuity detection/control circuit 15 generates either an enabling signal or a disabling signal in response to the effective-area signal. The discontinuity detection/control circuit 15 outputs either the enabling signal or the disabling signal to the address generation circuit 17. When the present moment (or the currently-processed time segment of the input video signal) corresponds to a position within the effective area of the current frame, the discontinuity detection/control circuit 15 outputs the enabling signal to the address generation circuit 17. When the present moment (or the currently-processed time segment of the input video signal) corresponds to a position outside the effective area of the current frame, the discontinuity detection/control circuit 15 outputs the disabling signal to the address generation circuit 17.

The discontinuity detection/control circuit 15 detects a timing, which corresponds to the position of a head of every frame (a head of the effective area in every frame) represented by the input video signal, in response to the H pulse signal and the V pulse signal. As long as it is determined that the input video signal does not become discontinuous, the discontinuity detection/control circuit 15 generates a first load signal (a first load pulse) in response to the detected timing. Preferably, the duration of the first load signal is set to a given short time interval. The discontinuity detection/control circuit 15 outputs the first load signal to an address latch 16.

The discontinuity detection/control circuit 15 has a function of determining whether or not a discontinuity disappears from the input video signal and hence the input video signal returns to its normal state. This determination is implemented by comparing the phases of the horizontal sync signal and the H pulse signal with each other, and also comparing the phases of the vertical sync signal and the V pulse signal with each other. Upon detection of a timing corresponding to the position of a head of a first frame (a head of the effective area in a first frame) after it is determined that a discontinuity disappears from the input video signal, the discontinuity detection/control circuit 15 generates a second load signal and outputs the second load signal to the address generation circuit 17. At the same time, the discontinuity detection/control circuit 15 replaces the disabling signal with the enabling signal. In addition, the discontinuity detection/control circuit 15 suspends the generation of the halt signal.

The PLL circuit 14 feeds the sampling clock signal "fs" to the address generation circuit 17 as an address updating clock signal. The address generation circuit 17 produces a signal of a memory address (a memory address signal) in response to the address updating clock signal, that is, the sampling clock signal "fs". The memory address represented by the memory address signal can be periodically updated or incremented in response to the address updating clock signal (the sampling clock signal "fs"). The enabling signal fed to the address generation circuit 17 from the discontinuity detection/control circuit 15 permits the memory address signal to be periodically updated or incremented in response to the address updating clock signal (the sampling clock signal "fs"). The disabling signal fed to the address generation circuit 17 from the discontinuity detection/control circuit 15 inhibits the memory address signal from being periodically updated or incremented in response to the address updating clock signal (the sampling clock signal "fs"). The address generation circuit 17 outputs the memory address signal to the address latch 16 and a memory 18.

The PLL circuit 14 feeds the sampling clock signal "fs" to the address latch 16. As previously indicated, the address latch 16 receives the first load signal (the first load pulse) from the discontinuity detection/control circuit 15. The device 16 latches the memory address signal, which corresponds to the position of a head in every frame (a head of the effective area in every frame) represented by the input video signal, in response to the first load signal and the sampling clock signal "fs". The memory address signal latched by the device 16 is updated for every frame. The memory address signal latched by the device 16 is applied to the address generation circuit 17.

The PLL circuit 14 outputs the sampling clock signal "fs" to the A/D converter 13. The A/D converter 13 periodically samples the output signal of the low pass filter 12 in response to the sampling clock signal "fs", and converts every sample of the output signal of the low pass filter 12 into a digital video signal sample (a video data piece). The A/D converter 13 sequentially outputs digital video signal samples (video data pieces) to the memory 18.

The memory 18 stores every video data piece (every digital video signal sample) into its storage segment, the address of which is equal to the address represented by the memory address signal fed from the address generation circuit 17. In the case where the address is periodically updated, video data pieces generated by the A/D converter 13 are sequentially and cyclically stored into storage segments of the memory 18. Video data pieces in the memory 18 correspond to a given number of frames. The compression processing circuit 19 reads out video data pieces from the memory 18. The video data pieces read out from the memory 18 compose output video data from the memory 18.

The compression processing circuit 19 compressively encodes the output video data from the memory 18 into encoding-resultant video data according to a known MPEG encoding algorithm. The compression processing circuit 19 feeds the encoding-resultant video data to a memory 20.

The memory 20 accumulates the encoding-resultant video data. After the memory 20 accumulates a 1-program-corresponding mount of the encoding-resultant video data, the encoding-resultant video data is read out from the memory 20 at a constant rate. The memory 20 includes a recording medium such as a hard disc or an optical disc.

Figure 2:
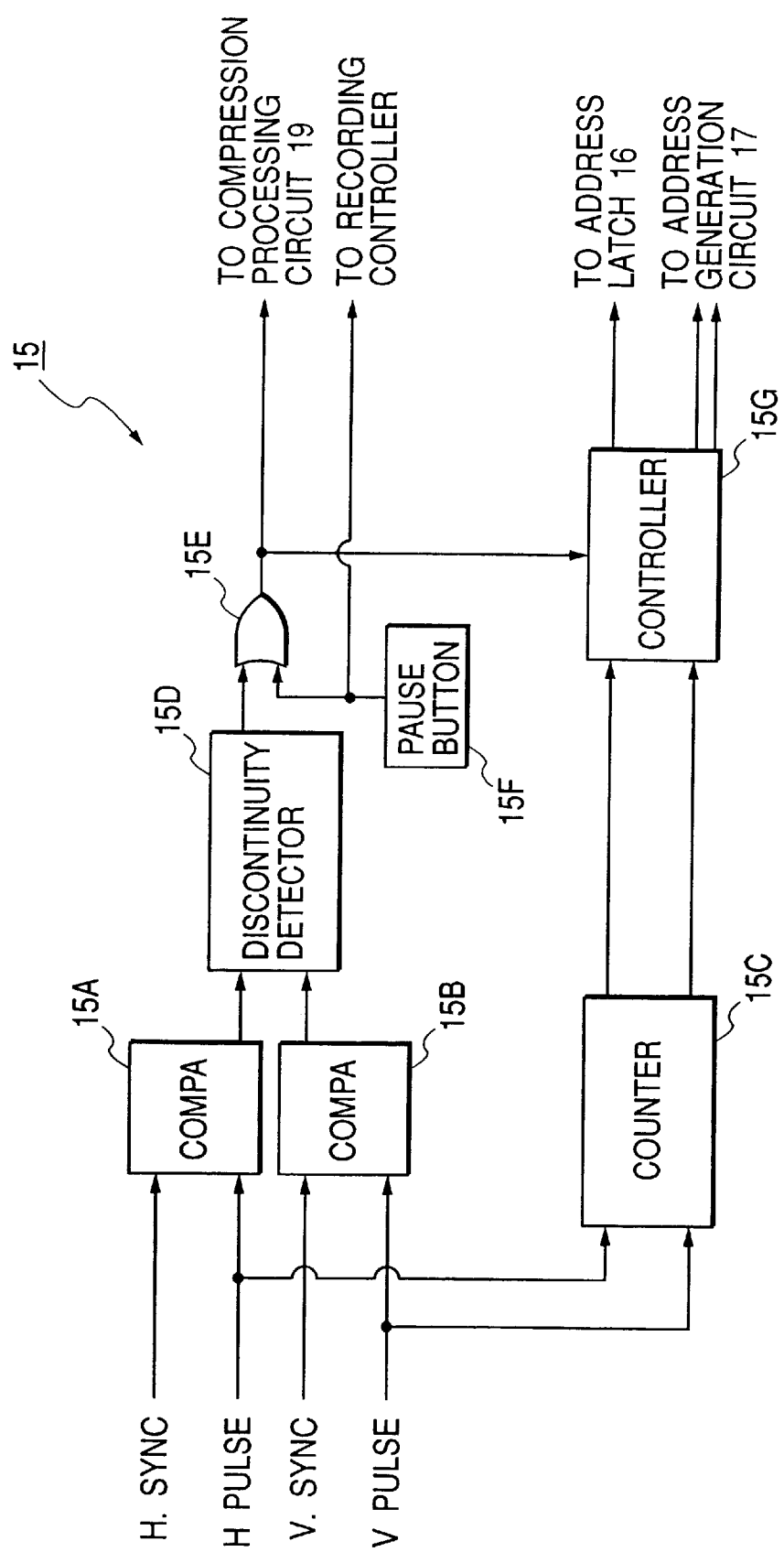
FIG. 2 is a block diagram of a discontinuity detection/control circuit in FIG. 1.

As shown in FIG. 2, the discontinuity detection/control circuit includes comparators 15A and 15B, a counter 15C, a discontinuity detector 15D, an OR gate 15E, an encoding pause button 15F, and a controller 15G.

In the discontinuity detection/control circuit 15, the device 15A compares the phases of the horizontal sync signal and the H pulse signal with each other to determine whether or not the phase lock between the horizontal sync signal and the H pulse signal is lost. When it is determined that the phase lock between the horizontal sync signal and the H pulse signal is lost, the comparator 15A outputs a "1" signal (a high-level signal) to the discontinuity detector 15D. Otherwise, the comparator 15A outputs a "0" signal (a low-level signal) to the discontinuity detector 15D.

The device 15B compares the phases of the vertical sync signal and the V pulse signal with each other to determine whether or not the phase lock between the vertical sync signal and the V pulse signal is lost. When it is determined that the phase lock between the vertical sync signal and the V pulse signal is lost, the comparator 15B outputs a "1" signal to the discontinuity detector 15D. Otherwise, the comparator 15B outputs a "0" signal to the discontinuity detector 15D.

The discontinuity detector 15D determines whether or not the input video signal becomes discontinuous in response to the output signals of the comparators 15A and 15B. When at least one of the output signals of the comparators 15A and 15B is "1", the discontinuity detector 15D outputs a "1" signal to a first input terminal of the OR gate 15E as an indication of the occurrence of a discontinuity in the input video signal. Otherwise, the discontinuity detector 15D outputs a "0" signal to the first input terminal of the OR gate 15E as an indication that the input video signal remains continuous. The discontinuity detector 15D includes, for example, an OR circuit.

The encoding pause button 15F outputs an encoding pause signal, which is a "1" signal, to a second input terminal of the OR gate 15E and a recording controller (not shown) when being changed to its ON position by a user. The encoding pause button 15F outputs an encoding pause cancel signal, which is a "0" signal, to the second input terminal of the OR gate 15E and the recording controller (not shown) when being returned to its OFF position by the user.

When at least one of the output signal of the discontinuity detector 15D and the output signal of the encoding pause button 15F is "1", the OR gate 15E outputs a "1" signal as a halt signal. Otherwise, the OR gate 15E outputs a "0" signal. The output signal of the OR gate 15E is fed to the controller 15G and also the compression processing circuit 19 (see FIG. 1).

The counter 15C responds to every pulse in the H pulse signal and also every pulse in the V pulse signal, thereby detecting an effective area of pictures (frames or fields) represented by the input video signal and generating an effective-area signal representative thereof. The counter 15C outputs the effective-area signal to the controller 15G. The effective-area signal is "1" when the present moment (or the currently-processed time segment of the input video signal) corresponds to a position within the effective area of the current frame. The effective-area signal is "0" when the present moment (or the currently-processed time segment of the input video signal) corresponds to a position outside the effective area of the current frame.

The counter 15C detects a timing, which corresponds to the position of a head of every frame (a head of the effective area in every frame) represented by the input video signal, in response to the H pulse signal and the V pulse signal. The counter 15C generates a frame head pulse corresponding to the detected timing. The counter 15C outputs the frame head pulse to the controller 15G.

The controller 15G includes, for example, a programmable logic device which operates in accordance with a program stored in its internal ROM. The program is designed to implement processes mentioned later. Alternatively, the controller 15G may include a logic circuit.

In the case where the output signal of the OR gate 15E remains "0", the controller 15G generates either an enabling signal or a disabling signal in response to the effective-area signal. The controller 15G outputs either the enabling signal or the disabling signal to the address generation circuit 17 (see FIG. 1). When the effective-area signal is "1", that is, when the present moment (or the currently-processed time segment of the input video signal) corresponds to a position within the effective area of the current frame, the controller 15G outputs the enabling signal to the address generation circuit 17. When the effective-area signal is "0", that is, when the present moment (or the currently-processed time segment of the input video signal) corresponds to a position outside the effective area of the current frame, the controller 15G outputs the disabling signal to the address generation circuit 17.

In the case where the output signal of the OR gate 15E remains "0", the controller 15G generates a first load signal in response to every frame head pulse fed from the counter 15C. The controller 15G outputs the first load signal to the address latch 16 (see FIG. 1).

In the case where the output signal of the OR gate 15E is "1", the controller 15G continuously outputs the disabling signal to the address generation circuit 17 (see FIG. 1). In addition, the controller 15G is continuously inhibited from outputting the first load signal to the address latch 16 (see FIG. 1).

After the output signal of the OR gate 15E returns to "0", the controller 15G generates a second load signal in response to a first frame head pulse fed from the counter 15C. The controller 15G outputs the second load signal to the address generation circuit 17 (see FIG. 1).

When the discontinuity detector 15D determines that the input video signal becomes discontinuous, the discontinuity detector 15D outputs a "1" signal to the OR gate 15E. The "1" signal is transmitted via the OR gate 15E to the compression processing circuit 19 (see FIG. 1) as a halt signal. When the encoding pause button 15F is changed to its ON position by the user, the encoding pause button 15F outputs a "1" signal to the OR gate 15E. The "1" signal is transmitted via the OR gate 15E to the compression processing circuit 19 (see FIG. 1) as a halt signal. The "1" signal outputted from the encoding pause button 15F is used an indication that the input video signal becomes discontinuous.

It is assumed that a discontinuity occurs in the input video signal as a result of, for example, a change of an input channel. The discontinuity in the input video signal causes at least one of the horizontal sync signal and the vertical sync signal outputted from the sync separation circuit 11 to be also discontinuous. On the other hand, during at least an initial stage following the discontinuity in the input video signal, the H pulse signal and the V pulse signal generated by the PLL circuit 14 remain in conditions phase-locked with respect to the horizontal sync signal and the vertical sync signal which are present before the occurrence of the discontinuity. Thus, the discontinuity detection/control circuit 15 detects the occurrence of the discontinuity in the input video signal by comparing the phases of the horizontal sync signal and the H pulse signal with each other, and also comparing the phases of the vertical sync signal and the V pulse signal with each other.

Upon the detection of the occurrence of the discontinuity in the input video signal, the discontinuity detection/control circuit 15 generates a disabling signal. The discontinuity detection/control circuit 15 feeds the disabling signal to the address generation circuit 17. The address generation circuit 17 suspends the updating of the memory address signal in response to the disabling signal. Upon the detection of the occurrence of the discontinuity in the input video signal, the discontinuity detection/control circuit 15 also generates a halt signal. The discontinuity detection/control circuit 15 feeds the halt signal to the compression processing circuit 19. The compression processing circuit 19 suspends the compressively encoding of the video data in response to the halt signal.

During the suspension of the compressively encoding by the compression processing circuit 19, the discontinuity detection/control circuit 15 remains comparing the phases of the horizontal sync signal and the H pulse signal with each other, and also comparing the phases of the vertical sync signal and the V pulse signal with each other to determine whether or not the discontinuity disappears from the input video signal and hence the input video signal returns to its normal state (determine whether or not the phase lock between the horizontal sync signal and the H pulse signal and also the phase lock between the vertical sync signal and the V pulse signal are restored).

After it is determined that the discontinuity disappears from the input video signal and hence the input video signal returns to its normal state, the discontinuity detection/control circuit 15 detects a timing which corresponds to the position of a head of a first frame (a head of the effective area in a first frame) represented by the input video signal. Upon the detection of the timing corresponding to the position of the head of the first frame, the discontinuity detection/control circuit 15 generates a second load signal and outputs the second load signal to the address generation circuit 17. Also, the discontinuity detection/control circuit 15 replaces the disabling signal with the enabling signal, and outputs the enabling signal to the address generation circuit 17. In addition, the discontinuity detection/control circuit 15 suspends the generation of the halt signal. The address generation circuit 17 is loaded with the memory address signal from the address latch 16 in response to the second load signal. Thus, the memory address signal fed to the memory 18 from the address generation circuit 17 is equalized to the memory address signal latched by the address latch 16 which represents an address corresponding to a head of a previous frame (a head of the effective area in a previous frame) subjected to the discontinuity in the input video signal. Then, the memory address signal fed to the memory 18 from the address generation circuit 17 is periodically updated or incremented from the frame-head-corresponding address in response to the sampling clock signal "fs" since the disabling signal fed to the address generation circuit 17 is replaced by the enabling signal. Digital video signal samples outputted from the A/D converter 13 are sequentially written into respective positionally-correct storage segments of the memory 18 while the memory address signal fed to the memory 18 is periodically updated or incremented. Accordingly, the normally writing of digital video signal samples into the memory 18 from the A/D converter 13 restarts. Regarding the restart, a first digital video signal sample written into the memory 18 corresponds to the head of the present frame (the head of the effective area in the present frame), and the storage segment into which the first digital video signal is written corresponds to the head of the previous frame (the head of the effective area in the previous frame) subjected to the discontinuity in the input video signal. When the generation of the halt signal is suspended, the compression processing circuit 19 restarts the readout of the video data from the memory 18 and the compressively encoding of the video data.

In the case where a discontinuity occurs in the input video signal at a mid point in a frame and this frame becomes a defective frame, a 1-frame-corresponding set of digital video signal samples corresponding to the defective frame and an associated old frame are left in the memory 18. Also, digital video signal samples corresponding to a given number of previous complete frames are left in the memory 18. After the discontinuity disappears and hence the input video signal returns to its normal state, the normally writing of digital video signal samples into the memory 18 from the A/D converter 13 is restarted at a moment corresponding to a head of a first new frame (a head of the effective area in a first new frame). Firstly, digital video signal samples composing a complete set for the new frame are stored into positionally-correct storage segments of the memory 18 respectively. In the memory 18, the digital video signal samples corresponding to the new frame are written over the digital video signal samples corresponding to the defective frame and the associated old frame. Accordingly, the digital video signal samples corresponding to the defective frame are prevented from being read out and processed by the compression processing circuit 19. After the discontinuity disappears and hence the input video signal returns to its normal state, a complete set of the digital video signal samples for the new frame is transmitted from the memory 18 to the compression processing circuit 19, and is processed by the compression processing circuit 19. Accordingly, even if a discontinuity causing a defective frame (a defective picture) occurs in the input video signal, the defective frame (the defective picture) is automatically removed from a stream of frames processed by the compression processing circuit 19. Thus, in the case where a discontinuity occurs in the input video signal and then the discontinuity disappears therefrom, the compression processing circuit 19 can implement the compressively encoding while maintaining a frame sequence in a GOP (a group of pictures). Therefore, it is possible to execute a recording pause at every frame. In addition, the compressively encoding by the compression processing circuit 19 is prevented from significantly reducing picture qualities.

When the encoding pause button 15F is returned to its OFF position by the user, the information compressing apparatus operates similarly to the case of the 1-to-0 change of the output signal of the discontinuity detector 15D which reflects the disappearance of a discontinuity from the input video signal. As previously mentioned, when the encoding pause button 15F is returned to its OFF, the output signal of the encoding pause button 15F changes to "0". The change of the output signal of the encoding pause button 15F to "0" is used an indication that the input video signal returns from a discontinuous state to a normally continuous state.

The memory 18 may be controlled as follows. The data writing into the memory 18 is suspended in response to the disabling signal outputted from the discontinuity detection/control circuit 15. The data writing into the memory 18 is enabled in response to the enabling signal outputted from the discontinuity detection/control circuit 15.

It should be noted that this embodiment may be modified to process an audio signal rather than a video signal.

Second Embodiment

Figure 3:
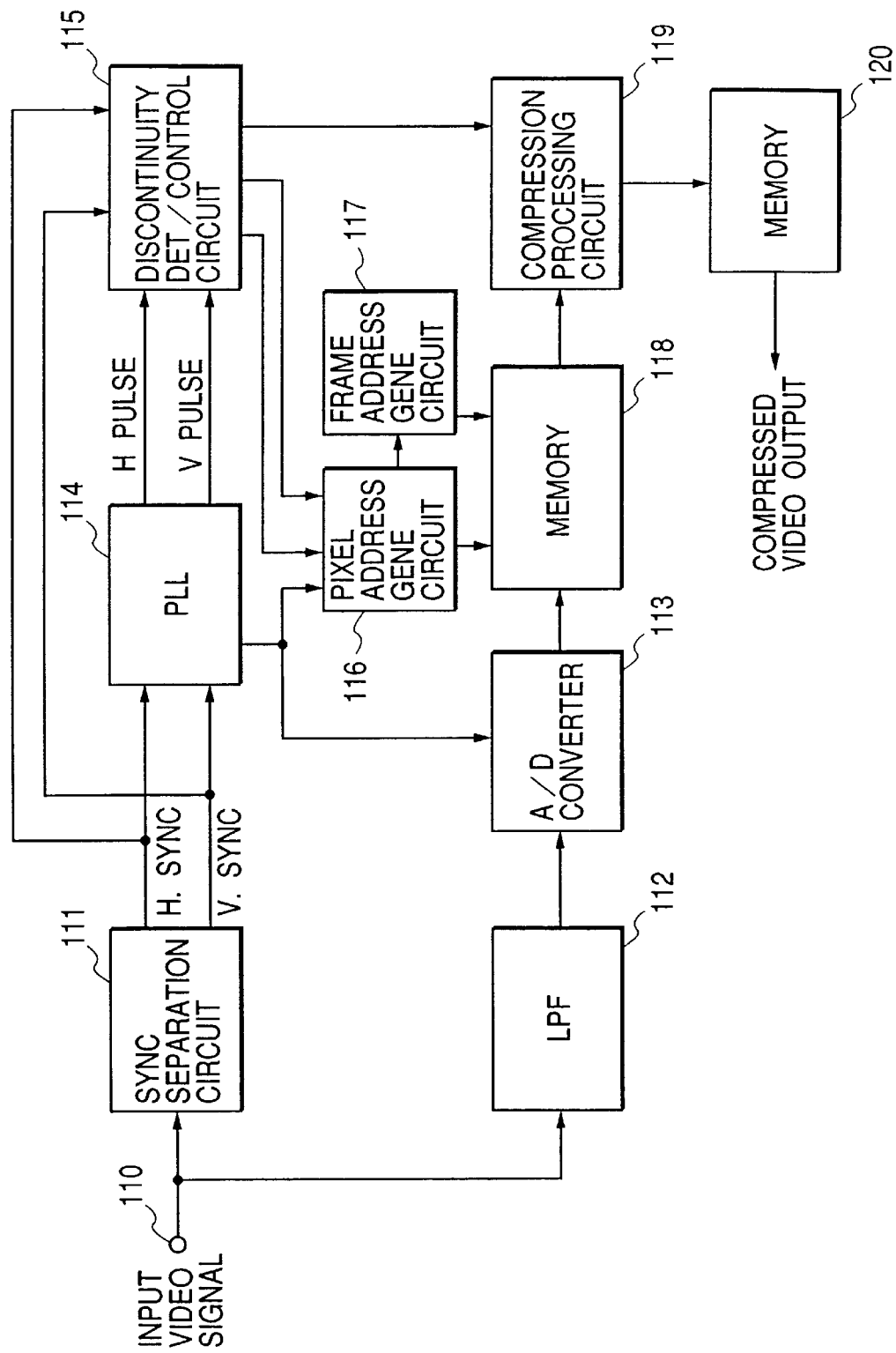
FIG. 3 is a block diagram of an information compression apparatus according to a second embodiment of this invention.

FIG. 3 shows an information compressing apparatus according to a second embodiment of this invention. With reference to FIG. 3, an input video signal is fed via an input terminal 110 to a sync separation circuit 111 and a low pass filter (LPF) 112.

The sync separation circuit 111 separates a horizontal sync signal (H. SYNC) from the input video signal, In addition, the sync separation circuit 111 separates a vertical sync signal (V. SYNC) from the input video signal.

The low pass filter 112 removes high-frequency components from the input video signal. The low pass filter 112 outputs a resultant signal to an analog-to-digital (A/D) converter 113. The A/D converter 113 changes the output signal of the low pass filter 12 into a corresponding digital video signal in response to a clock signal (a sampling clock signal) "fs".

The sync separation circuit 111 outputs the horizontal sync signal and the vertical sync signal to a PLL (phase locked loop) circuit 114. A first section of the PLL circuit 114 generates a sampling clock signal "fs" in response to the horizontal sync signal and the vertical sync signal. The sampling clock signal "fs" has a given frequency equal to or higher than twice the maximum frequency of the input video signal. The sampling clock signal "fs" is phase-locked with respect to the horizontal sync signal and the vertical sync signal. A second section of the PLL circuit 114 generates an H pulse signal in response to the horizontal sync signal. The H pulse signal is phase-locked with respect to the horizontal sync signal. The H pulse signal has a given frequency equal to a horizontal scanning frequency related to the input video signal. A third section of the PLL circuit 114 generates a V pulse signal in response to the vertical sync signal. The V pulse signal is phase-locked with respect to the vertical sync signal. The V pulse signal has a given frequency equal to a vertical scanning frequency related to the input video signal.

When a discontinuity occurs in the input video signal, at least one of the horizontal sync signal and the vertical sync signal outputted from the sync separation circuit 111 becomes also discontinuous. On the other hand, during a short time interval following the moment of the occurrence of the discontinuity, the H pulse signal and the V pulse signal generated by the PLL circuit 114 remain in conditions phase-locked with respect to the horizontal sync signal and the vertical sync signal which are present before the occurrence of the discontinuity.

The sync separation circuit 111 outputs the horizontal sync signal and the vertical sync signal to a discontinuity detection/control circuit 115. The PLL circuit 114 outputs the H pulse signal and the V pulse signal to the discontinuity detection/control circuit 115.

The discontinuity detection/control circuit 115 compares the phases of the horizontal sync signal and the H pulse signal with each other. Also, the discontinuity detection/control circuit 115 compares the phases of the vertical sync signal and the V pulse signal with each other. These phase comparisons are to determine whether or not the input video signal becomes discontinuous (determine whether or not at least one of the phase lock between the horizontal sync signal and the H pulse signal and the phase lock between the vertical sync signal and the V pulse signal is lost). When it is determined that the input video signal becomes discontinuous, the discontinuity detection/control circuit 115 generates a disabling signal, a clear signal, and a halt signal. The discontinuity detection/control circuit 115 outputs the disabling signal and the clear signal to a pixel address generation circuit 116. The discontinuity detection/control circuit 115 outputs the halt signal to a compression processing circuit 119.

The discontinuity detection/control circuit 115 generates a signal of an effective area of every picture (every frame) represented by the input video signal in response to the H pulse signal and the V pulse signal. As long as it is determined that the input video signal does not become discontinuous, the discontinuity detection/control circuit 115 generates either an enabling signal or a disabling signal in response to the effective-area signal. The discontinuity detection/control circuit 115 outputs either the enabling signal or the disabling signal to the pixel address generation circuit 116. When the present moment (or the currently-processed time segment of the input video signal) corresponds to a position within the effective area of the current frame, the discontinuity detection/control circuit 115 outputs the enabling signal to the pixel address generation circuit 116. When the present moment (or the currently-processed time segment of the input video signal) corresponds to a position outside the effective area of the current frame, the discontinuity detection/control circuit 115 outputs the disabling signal to the pixel address generation circuit 116.

The discontinuity detection/control circuit 115 has a function of determining whether or not a discontinuity disappears from the input video signal and hence the input video signal returns to its normal state. This determination is implemented by comparing the phases of the horizontal sync signal and the H pulse signal with each other, and also comparing the phases of the vertical sync signal and the V pulse signal with each other. The discontinuity detection/control circuit 115 detects a timing, which corresponds to the position of a head of every frame (a head of the effective area in every frame) represented by the input video signal, in response to the H pulse signal and the V pulse signal. Upon detection of a timing corresponding to the position of a head of a first frame (a head of the effective area in a first frame) after it is determined that a discontinuity disappears from the input video signal, the discontinuity detection/control circuit 115 replaces the disabling signal with the enabling signal. In addition, the discontinuity detection/control circuit 115 suspends the generation of the halt signal.

The PLL circuit 114 feeds the sampling clock signal "fs" to the pixel address generation circuit 116 as an address updating clock signal. The pixel address generation circuit 116 produces a signal (a pixel-related address signal) of a pixel-related address in response to the address updating clock signal, that is, the sampling clock signal "fs". The pixel-related address represented by the pixel-related address signal can be periodically updated or incremented in response to the address updating clock signal (the sampling clock signal "fs"). The enabling signal fed to the pixel address generation circuit 116 from the discontinuity detection/control circuit 115 permits the pixel-related address signal to be periodically updated or incremented in response to the address updating clock signal (the sampling clock signal "fs"). The disabling signal fed to the pixel address generation circuit 116 from the discontinuity detection/control circuit 115 inhibits the pixel-related address signal from being periodically updated or incremented in response to the address updating clock signal (the sampling clock signal "fs"). The pixel address generation circuit 116 feeds the pixel-related address signal to a frame address generation circuit 117 and a memory 118.

The frame address generation circuit 117 produces a frame-related address signal in response to the pixel-related address signal. Normally, the frame-related address signal is updated each time the pixel-related address signal reaches a given address value. The frame address generation circuit 117 feeds the frame-related address signal to the memory 118.

The pixel-related address signal and the frame-related address signal fed to the memory 118 compose a memory address signal which determines an accessed storage segment of the memory 118.

The PLL circuit 114 outputs the sampling clock signal "fs" to the A/D converter 113. The A/D converter 113 periodically samples the output signal of the low pass filter 112 in response to the sampling clock signal "fs", and converts every sample of the output signal of the low pass filter 112 into a digital video signal sample (a video data piece). The A/D converter 113 sequentially outputs digital video signal samples (video data pieces) to the memory 118.

The memory 118 stores every video data piece (every digital video signal sample) into a storage segment, the address of which is equal to the address represented by the memory address signal, that is, the set of the pixel-related address signal and the frame-related address signal fed from the pixel address generation circuit 116 and the frame address generation circuit 117. In the case where the address is periodically updated, video data pieces generated by the A/D converter 113 are sequentially and cyclically stored into storage segments of the memory 118. Video data pieces in the memory 118 correspond to a given number of frames. The compression processing circuit 119 read out video data pieces from the memory 118. The video data pieces read out from the memory 118 compose output video data from the memory 118.

The compression processing circuit 119 compressively encodes the output video data from the memory 118 into encoding-resultant video data according to a known MPEG encoding algorithm. The compression processing circuit 119 feeds the encoding-resultant video data to a memory 120.

The memory 120 accumulates the encoding-resultant video data. After the memory 120 accumulates a 1-program-corresponding mount of the encoding-resultant video data, the encoding-resultant video data is read out from the memory 120 at a constant rate. The memory 120 includes a recording medium such as a hard disc or an optical disc.

Figure 4:
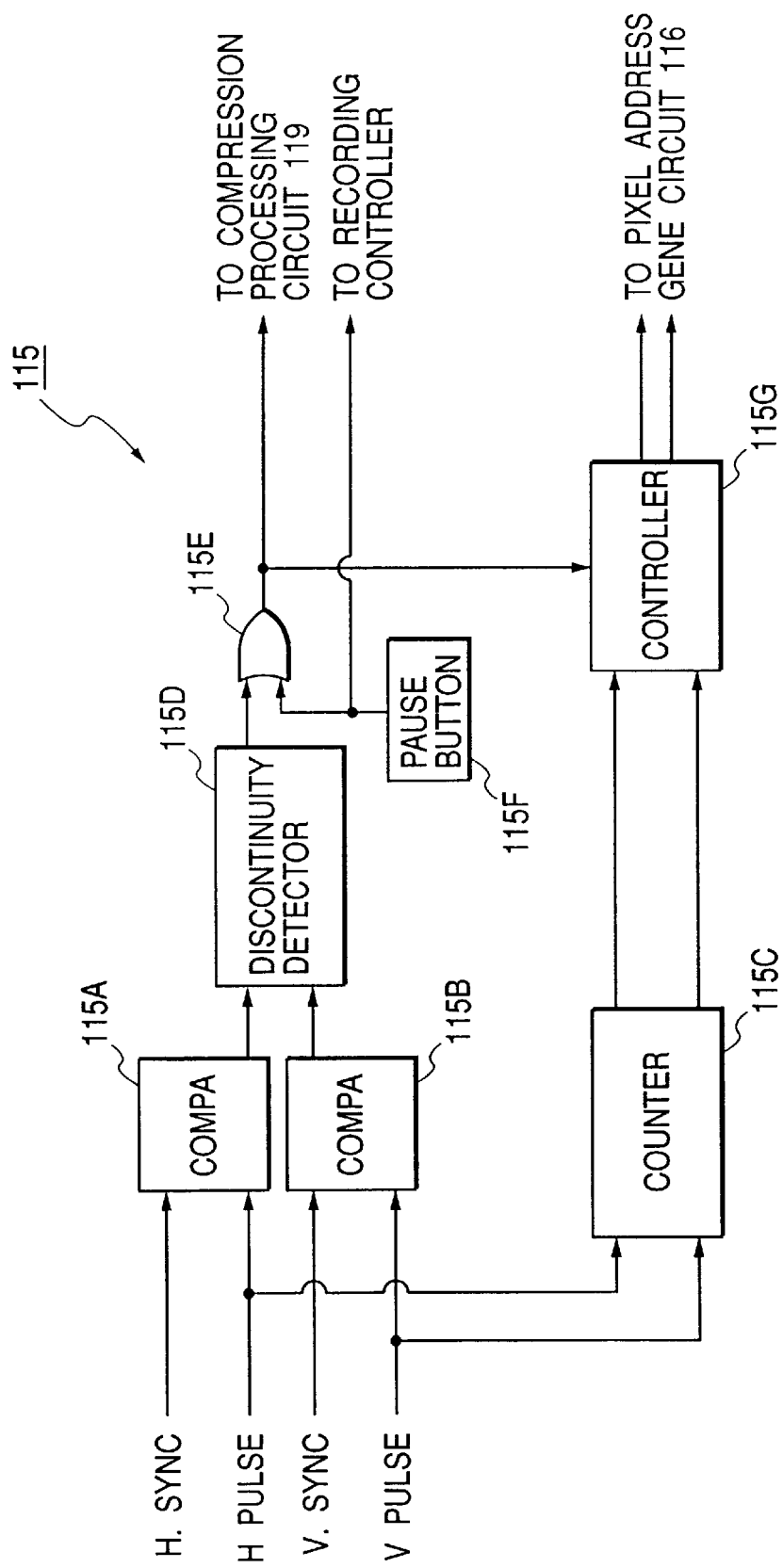
FIG. 4 is a block diagram of a discontinuity detection/control circuit in FIG. 3.

As shown in FIG. 4, the discontinuity detection/control circuit 115 includes comparators 115A and 115B, a counter 115C, a discontinuity detector 115D, an OR gate 115E, an encoding pause button 115F, and a controller 115G.

In the discontinuity detection/control circuit 115, the device 115A compares the phases of the horizontal sync signal and the H pulse signal with each other to determine whether or not the phase lock between the horizontal sync signal and the H pulse signal is lost. When it is determined that the phase lock between the horizontal sync signal and the H pulse signal is lost, the comparator 115A outputs a "1" signal (a high-level signal) to the discontinuity detector 115D. Otherwise, the comparator 115A outputs a "0" signal (a low-level signal) to the discontinuity detector 115D.

The device 115B compares the phases of the vertical sync signal and the V pulse signal with each other to determine whether or not the phase lock between the vertical sync signal and the V pulse signal is lost. When it is determined that the phase lock between the vertical sync signal and the V pulse signal is lost, the comparator 115B outputs a "1" signal to the discontinuity detector 115D. Otherwise, the comparator 115B outputs a "0" signal to the discontinuity detector 115D.

The discontinuity detector 115D determines whether or not the input video signal becomes discontinuous in response to the output signals of the comparators 115A and 115B. When at least one of the output signals of the comparators 115A and 115B is "1", the discontinuity detector 115D outputs a "1" signal to a first input terminal of the OR gate 115E as an indication of the occurrence of a discontinuity in the input video signal. Otherwise, the discontinuity detector 115D outputs a "0" signal to the first input terminal of the OR gate 115E as an indication that the input video signal remains continuous. The discontinuity detector 115D includes, for example, an OR circuit.

The encoding pause button 115F outputs an encoding pause signal, which is a "1" signal, to a second input terminal of the OR gate 115E and a recording controller (not shown) when being changed to its ON position by a user. The encoding pause button 115F outputs an encoding pause cancel signal, which is a "0" signal, to the second input terminal of the OR gate 115E and the recording controller (not shown) when being returned to its OFF position by the user.

When at least one of the output signal of the discontinuity detector 115D and the output signal of the encoding pause button 115F is "1", the OR gate 115E outputs a "1" signal as a halt signal. Otherwise, the OR gate 115E outputs a "0" signal. The output signal of the OR gate 15E is fed to the controller 115G and also the compression processing circuit 119 (see FIG. 3).

The counter 115C responds to every pulse in the H pulse signal and also every pulse in the V pulse signal, thereby detecting an effective area of pictures (frames or fields) represented by the input video signal and generating an effective-area signal representative thereof. The counter 115C outputs the effective-area signal to the controller 115G. The effective-area signal is "1" when the present moment (or the currently-processed time segment of the input video signal) corresponds to a position within the effective area of the current frame. The effective-area signal is "0" when the present moment (or the currently-processed time segment of the input video signal) corresponds to a position outside the effective area of the current frame.

The counter 115C detects a timing, which corresponds to the position of a head of every frame (a head of the effective area in every frame) represented by the input video signal, in response to the H pulse signal and the V pulse signal. The counter 115C generates a frame head pulse corresponding to the detected timing. The counter 115C outputs the frame head pulse to the controller 115G.

The controller 115G includes, for example, a programmable logic device which operates in accordance with a program stored in its internal ROM. The program is designed to implement processes mentioned later. Alternatively, the controller 115G may include a logic circuit.

In the case where the output signal of the OR gate 115E remains "0", the controller 115G generates either an enabling signal or a disabling signal in response to the effective-area signal. The controller 115G outputs either the enabling signal or the disabling signal to the pixel address generation circuit 116 (see FIG. 3). When the effective-area signal is "1", that is, when the present moment (or the currently-processed time segment of the input video signal) corresponds to a position within the effective area of the current frame, the controller 115G outputs the enabling signal to the pixel address generation circuit 116. When the effective-area signal is "0", that is, when the present moment (or the currently-processed time segment of the input video signal) corresponds to a position outside the effective area of the current frame, the controller 115G outputs the disabling signal to the pixel address generation circuit 116.

In the case where the output signal of the OR gate 115E changes to "1", the controller 115G outputs the disabling signal to the pixel address generation circuit 116 (see FIG. 3). In addition, the controller 115G outputs the clear signal to the pixel address generation circuit 116. While the output signal of the OR gate 115E remains "1", the controller 115G continuously outputs the disabling signal to the pixel address generation circuit 116.

After the output signal of the OR gate 115E returns to "0", the controller 115G replaces the disabling signal with the enabling signal in response to a first frame head pulse fed from the counter 115C. The controller 115G outputs the enabling signal to the pixel address generation circuit 116 (see FIG. 3).

When the discontinuity detector 115D determines that the input video signal becomes discontinuous, the discontinuity detector 115D outputs a "1" signal to the OR gate 115E. The "1" signal is transmitted via the OR gate 115E to the compression processing circuit 119 (see FIG. 3) as a halt signal. When the encoding pause button 115F is changed to its ON position by the user, the encoding pause button 115F outputs a "1" signal to the OR gate 115E. The "1" signal is transmitted via the OR gate 115E to the compression processing circuit 119 (see FIG. 3) as a halt signal. The "1" signal outputted from the encoding pause button 115F is used an indication that the input video signal becomes discontinuous.

It is assumed that a discontinuity occurs in the input video signal as a result of, for example, a change of an input channel. The discontinuity in the input video signal causes at least one of the horizontal sync signal and the vertical sync signal outputted from the sync separation circuit 111 to be also discontinuous. On the other hand, during at least an initial stage following the discontinuity in the input video signal, the H pulse signal and the V pulse signal generated by the PLL circuit 114 continue to be in conditions phase-locked with respect to the horizontal sync signal and the vertical sync signal which are present before the occurrence of the discontinuity. Thus, the discontinuity detection/control circuit 115 detects the occurrence of the discontinuity in the input video signal by comparing the phases of the horizontal sync signal and the H pulse signal with each other, and also comparing the phases of the vertical sync signal and the V pulse signal with each other.

Upon the detection of the occurrence of the discontinuity in the input video signal, the discontinuity detection/control circuit 115 generates a disabling signal. The discontinuity detection/control circuit 115 feeds the disabling signal to the pixel address generation circuit 116. The pixel address generation circuit 116 suspends the updating of the pixel-related address signal in response to the disabling signal. The suspension of the updating of the pixel-related address signal causes suspension of the frame-related address signal which is generated by the frame address generation circuit 117. Upon the detection of the occurrence of the discontinuity in the input video signal, the discontinuity detection/control circuit 115 also generates a clear signal. The discontinuity detection/control circuit 115 outputs the clear signal to the pixel address generation circuit 116. The pixel address generation circuit 116 resets the pixel-related address signal to a predetermined initial address in response to the clear signal. The predetermined initial address corresponds to a head of a frame (a head of the effective area of a frame). Upon the detection of the occurrence of the discontinuity in the input video signal, the discontinuity detection/control circuit 115 also generates a halt signal. The discontinuity detection/control circuit 115 feeds the halt signal to the compression processing circuit 119. The compression processing circuit 119 suspends the compressively encoding of the video data in response to the halt signal.

During the suspension of the compressively encoding by the compression processing circuit 119, the discontinuity detection/control circuit 115 remains comparing the phases of the horizontal sync signal and the H pulse signal with each other, and also comparing the phases of the vertical sync signal and the V pulse signal with each other to determine whether or not the discontinuity disappears from the input video signal and hence the input video signal returns to its normal state (determine whether or not the phase lock between the horizontal sync signal and the H pulse signal and also the phase lock between the vertical sync signal and the V pulse signal are restored).

After it is determined that the discontinuity disappears from the input video signal and hence the input video signal returns to its normal state, the discontinuity detection/control circuit 115 detects a timing which corresponds to the position of a head of a first frame (a head of the effective area in a first frame) represented by the input video signal. Upon the detection of the timing corresponding to the position of the head of the first frame, the discontinuity detection/control circuit 115 replaces the disabling signal with the enabling signal, and outputs the enabling signal to the pixel address generation circuit 116. The pixel address generation circuit 116 starts the updating of the pixel-related address signal from the predetermined initial address (the frame-head-corresponding address) in response to the enabling signal. In addition, the discontinuity detection/control circuit 115 suspends the generation of the halt signal. Digital video signal samples outputted from the A/D converter 113 are sequentially written into respective positionally-correct storage segments of the memory 118 while the memory address signal (the pixel-related address signal and the frame-related address signal) fed to the memory 118 is periodically updated or incremented. Accordingly, the normally writing of digital video signal samples into the memory 118 from the A/D converter 113 restarts. Specifically, the pixel-related address signal restarts from the predetermined initial address (the frame-head-corresponding address) while the frame-related address signal restarts from the same address value as that occurring immediately before the enabling signal outputted from the discontinuity detection/control circuit 115 is replaced by the disabling signal in response to the detection of the discontinuity. Regarding the restart, a first digital video signal sample written into the memory 118 corresponds to the head of the present frame (the head of the effective area in the present frame), and the storage segment into which the first digital video signal sample is written corresponds to the head of the previous frame (the head of the effective area in the previous frame) subjected to the discontinuity in the input video signal. When the generation of the halt signal is suspended, the compression processing circuit 119 restarts the readout of the video data from the memory 118 and the compressively encoding of the video data.

In the case where a discontinuity occurs in the input video signal at a mid point in a frame and this frame becomes a defective frame, a 1-frame-corresponding set of digital video signal samples corresponding to the defective frame and an associated old frame are left in the memory 118. Also, digital video signal samples corresponding to a given number of previous complete frames are left in the memory 118. After the discontinuity disappears and hence the input video signal returns to its normal state, the normally writing of digital video signal samples into the memory 118 from the A/D converter 113 is restarted at a moment corresponding to a head of a first new frame (a head of the effective area in a first new frame). Firstly, digital video signal samples composing a complete set for the new frame are stored into positionally-correct storage segments of the memory 118 respectively. In the memory 118, the digital video signal samples corresponding to the new frame are written over the digital video signal samples corresponding to the defective frame and the associated old frame. Accordingly, the digital video signal samples corresponding to the defective frame are prevented from being read out and processed by the compression processing circuit 119. After the discontinuity disappears and hence the input video signal returns to its normal state, a complete set of the digital video signal samples for the new frame is transmitted from the memory 118 to the compression processing circuit 119, and is processed by the compression processing circuit 119. Accordingly, even if a discontinuity causing a defective frame (a defective picture) occurs in the input video signal, the defective frame (the defective picture) is automatically removed from a stream of frames processed by the compression processing circuit 119. Thus, in the case where a discontinuity occurs in the input video signal and then the discontinuity disappears therefrom, the compression processing circuit 119 can implement the compressively encoding while maintaining a frame sequence in a GOP (a group of pictures). Therefore, it is possible to execute a recording pause at every frame. In addition, the compressively encoding by the compression processing circuit 119 is prevented from significantly reducing picture qualities.

When the encoding pause button 115F is returned to its OFF position by the user, the information compressing apparatus operates similarly to the case of the 1-to-0 change of the output signal of the discontinuity detector 115D which reflects the disappearance of a discontinuity from the input video signal. As previously mentioned, when the encoding pause button 115F is returned to its OFF, the output signal of the encoding pause button 115F changes to "0". The change of the output signal of the encoding pause button 115F to "0" is used an indication that the input video signal returns from a discontinuous state to a normally continuous state.

The memory 118 may be controlled as follows. The data writing into the memory 118 is suspended in response to the disabling signal outputted from the discontinuity detection/control circuit 115. The data writing into the memory 118 is enabled in response to the enabling signal outputted from the discontinuity detection/control circuit 115.

It should be noted that this embodiment may be modified to process an audio signal rather than a video signal.

What is claimed is:

1. An information processing apparatus comprising:
    an address generation circuit for generating an address signal;
    a memory for storing an information signal containing a video signal in response to the address signal generated by the address generation circuit;
    first means for periodically updating the address signal generated by the address generation circuit;
    a compression processing circuit for reading out the information signal from the memory, and subjecting the read-out information signal to a compressively encoding process;
    second means for detecting a head of every frame represented by the information signal;
    third means for storing a state of the address signal generated by the address generation circuit which corresponds to the frame head detected by the second means;
    fourth means for detecting whether or not the information signal becomes discontinuous;
    fifth means for suspending operation of the first means and also operation of the compression processing circuit when the fourth means detects that the information signal becomes discontinuous;
    sixth means for detecting whether or not the information signal returns to a normally continuous state after the information signal becomes discontinuous; and
    seventh means for starting the updating of the address signal by the first means from the state stored by the third means when the sixth means detects that the information signal returns to its normally continuous state after the information signal becomes discontinuous.

2. An information processing apparatus as recited in claim 1, wherein the fourth means comprises:
    a sync separator for separating a first sync signal from the information signal;
    a PLL circuit for generating a second sync signal in response to the first sync signal; and
    a comparator for comparing the first sync signal and the second sync signal to detect whether or not the information signal becomes discontinuous.

3. An information processing apparatus as recited in claim 1, wherein the fourth means comprises:
    an encoding pause button; and
    means for detecting whether or not the information signal becomes discontinuous in response to a position of the encoding pause button.

4. An information processing apparatus as recited in claim 1, wherein the sixth means comprises:
    an encoding pause button; and
    means for detecting whether or not the information signal returns to a normally continuous state after the information signal becomes discontinuous in response to a position of the encoding pause button.

5. An information processing apparatus comprising:

a first address generation circuit for generating a first address signal corresponding to a pixel;

a second address generation circuit for generating a second address signal corresponding to a frame;

a memory for storing an information signal containing a video signal in response to the first address signal and the second address signal generated by the first address generation circuit and the second address generation circuit;

first means for periodically updating the first address signal generated by the first address generation circuit;

second means for updating the second address signal generated by the second address generation circuit in response to the first address signal generated by the first address generation circuit;

a compression processing circuit for reading out the information signal from the memory, and subjecting the read-out information signal to a compressively encoding process;

third means for detecting a head of every frame represented by the information signal;

fourth means for detecting whether or not the information signal becomes discontinuous;

fifth means for suspending operation of the first means and also operation of the compression processing circuit when the fourth means detects that the information signal becomes discontinuous;

sixth means for returning the first address signal to a predetermined initial state when the fourth means detects that the information signal becomes discontinuous;

seventh means for detecting whether or not the information signal returns to a normally continuous state after the information signal becomes discontinuous; and eighth means for, in cases where the seventh means detects that the information signal returns to its normally continuous state after the information signal becomes discontinuous, starting the updating of the first address signal by the first means from the predetermined initial state when the third means detects a frame head.

6. An information processing apparatus as recited in claim 5, wherein the fourth means comprises:

a sync separator for separating a first sync signal from the information signal;

a PLL circuit for generating a second sync signal in response to the first sync signal; and a comparator for comparing the first sync signal and the second sync signal to detect whether or not the information signal becomes discontinuous.

7. An information processing apparatus as recited in claim 5, wherein the fourth means comprises:

an encoding pause button; and means for detecting whether or not the information signal becomes discontinuous in response to a position of the encoding pause button.

8. An information processing apparatus as recited in claim 5, wherein the seventh means comprises:

an encoding pause button; and means for detecting whether or not the information signal returns to a normally continuous state after the information signal becomes discontinuous in response to a position of the encoding pause button.

9. A method comprising the steps of:

generating an address signal;

storing an information signal into a memory in response to the address signal, the information signal containing a video signal;

periodically updating the address signal;

reading out the information signal from the memory, and subjecting the read-out information signal to a compressively encoding process;

detecting a head of every frame represented by the information signal;

storing a state of the address signal which corresponds to the detected frame head;

detecting whether or not the information signal becomes discontinuous;

suspending the updating of the address signal, and also the reading-out of the information signal from the memory and the subjecting of the read-out information signal to the compressively encoding process when it is detected that the information signal becomes discontinuous;

detecting whether or not the information signal returns to a normally continuous state after the information signal becomes discontinuous; and starting the updating of the address signal when it is detected that the information signal returns to its normally continuous state after the information signal becomes discontinuous.

10. A method comprising the steps of:

generating a first address signal corresponding to a pixel;

generating a second address signal corresponding to a frame;

storing an information signal into a memory in response to the first address signal and the second address signal, the information signal containing a video signal;

periodically updating the first address signal;

updating the second address signal in response to the first address signal;

reading out the information signal from the memory, and subjecting the read-out information signal to a compressively encoding process;

detecting a head of every frame represented by the information signal;

detecting whether or not the information signal becomes discontinuous;

suspending the updating of the first address signal, and also the reading-out of the information signal from the memory and the subjecting of the read-out information signal to the compressively encoding process when it is detected that the information signal becomes discontinuous;

returning the first address signal to a predetermined initial state when it is detected that the information signal becomes discontinuous;

detecting whether or not the information signal returns to a normally continuous state after the information signal becomes discontinuous; and in cases where it is detected that the information signal returns to its normally continuous state after the information signal becomes discontinuous, starting the updating of the first address signal from the predetermined initial state when a frame head is detected.

* * * * *